2,848,051
METHOD FOR IMPROVING WELL CEMENTING JOBS

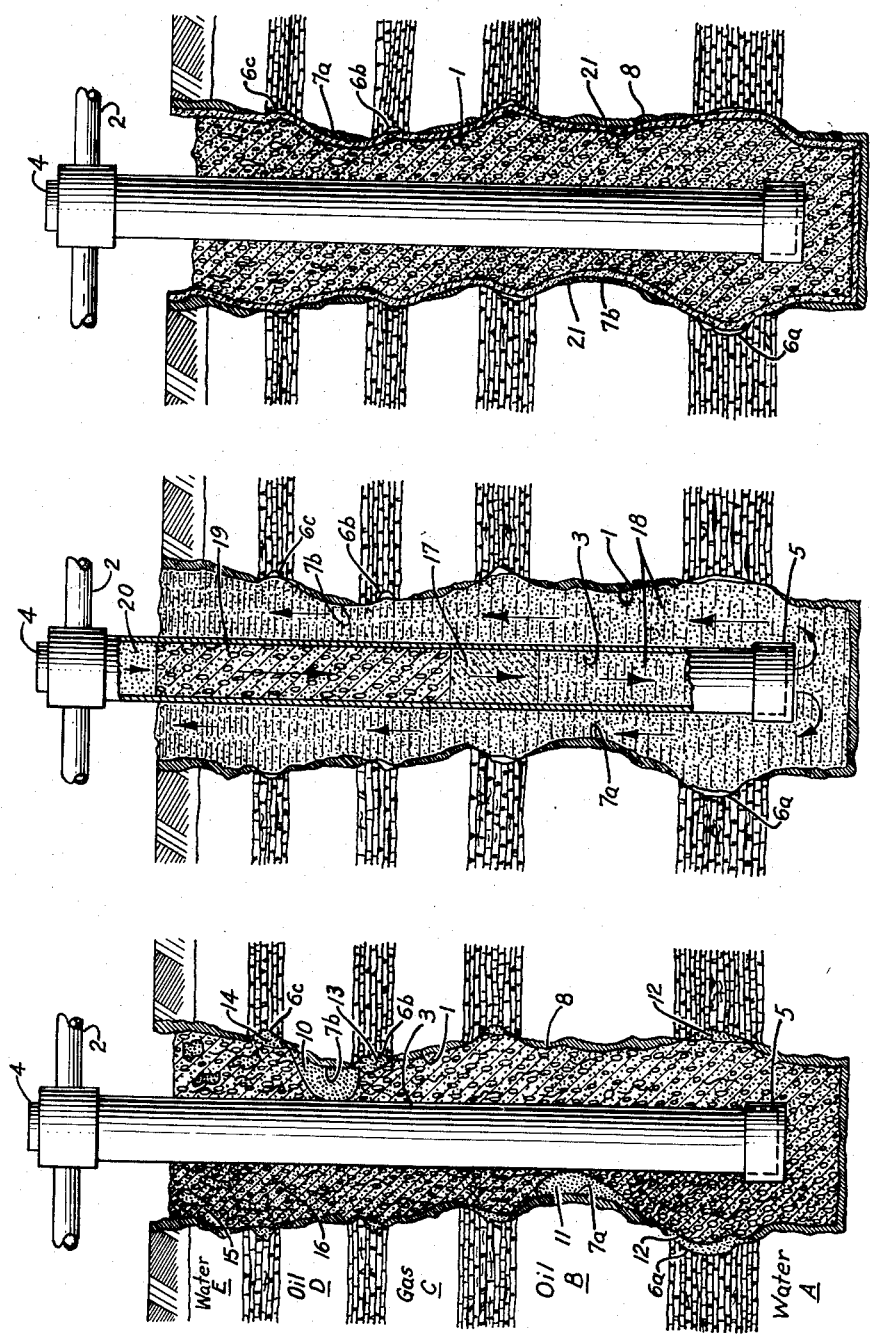

William K. Williams, Irving, Tex., assignor to The Atlantic Refining Company, Philadelphia, Pa., a corporation of Pennsylvania Application March 22, 1954, Serial No. 417,737

1 Claim. (Cl. 166—28)

This invention is generally concerned with an improved method of cementing wells. The invention is more particularly concerned with a method for displacing the drilling mud from the walls of a borehole prior to cementing the well casing in the borehole.

It is common practice in the art to drill a borehole with the air of drilling fluids, set a well casing therein, and thereafter to cement the casing in the borehole by circulating cement downwardly inside the casing to the bottom of the hole and then upwardly into the annulus between the wall of the borehole and the casing. In practicing this process, drilling fluid, hereinafter referred to as a "drilling mud" or "mud," is used for drilling the well. These muds are used for several reasons including to remove the cuttings from the bottom of the borehole by circulating the mud from the surface downwardly through the interior of the drilling string to the tool bit and then back to the surface. When the drilling is completed to the desired depth the drilling mud remains in the borehole and therefore is present in the casing and in the annulus between the casing and the wall of the borehole. When the cement is introduced into the well in the cementation process it is necessary to displace substantially all of the drilling mud at the desired localities where the cement is to be placed. Failure to displace this mud results in unsatisfactory distribution of cement both in the annulus cross-section and vertically along the casing. This undesirable distribution is usually referred to as channeling, meaning the failure of the cement slurry to displace all the mud in the well bore, thereby leaving patches or channels of mud in place within the cement column.

The objects of any casing cementing job and especially those on oil wells are to secure protection of the producing zone and casing against undesirable fluids and obtain effective segregation of the formations penetrated. These objects can only be achieved by eliminating all channeling, whereby the casing is completely surrounded with cement of good quality which prevents the flow of undesirable fluids into the oil producing areas.

The drilling muds used today vary considerably in respect to viscosity, composition, and the like. The muds most frequently used comprise a clay (usually a bentonitic clay) which is mixed with water. The viscosities of these clay muds are normally on the order of 20–200 cps. when the mud is being circulated. Since the normal viscosity of circulating cement approaches viscosities within the range of 500–2,000 cps., one would believe that normally the cement will displace most of the mud fluids. However, difficulties often arise when the cement starts to displace the clay slurry due to the fact that the calcium present in the cement reacts with the clay slurry which it contacts to form what is known as flocculated mud which has viscosities as high as 100,000 cps. Also, the uncontaminated mud upon remaining quiescent in protected locations forms into gelled mud having a high viscosity. Naturally the cement does not always displace this gelled and flocculated mud because of the viscosities especially in the washed out portions of the borehole. Also, when these muds are being displaced from the annulus between the borehole wall and the casing restrictions therein are encountered and this gelled and flocculated mud accumulate therein. Since viscosity of the gelled and flocculated mud is greater than that of the cement, the cement takes the path of least resistance, thereby bypassing the viscous mud and forming patches or channels of mud within the cement column. Thus a faulty cementation job results which may not prevent the flow of undesirable fluids into the oil-producing areas. A further difficulty encountered is that along the borehole at locations where the strata is permeable the mud dehydrates and forms a mud filter cake which is near impermeable and which contains organic matter that might diffuse into the adjacent wet cement and eventually might cause the cement to deteriorate. This often weakens the peripheral edge of the column of the cement along the borehole to such an extent that very frequently the undesirable fluids flow into the oil producing areas.

Various means have been devised in an attempt to prevent the above difficulties. Among these have been the reduction in the hole size, increased rate of pumping of cement, alterations in physical and chemical properties of the cement slurry, movement of the casing during cementing, and the use of scratchers and centralizers on the casing. Some of these methods have their respective merits and advantages but they also have many disadvantages. No attempt will be made herein to make a comparison between the above methods except to state that a more efficient method is desired.

An object of this invention is to provide a new method for cementing an oil well whereby channeling and contamination of the cement is reduced to a minimum.

A further object of the present invention is to provide a new process for cementing wells whereby substantially all the drilling mud in advance of the cement is displaced from the annulus.

A further object of this invention is to provide in a cementation job a method for substantially displacing from the borehole the drilling muds in advance of the cement slurry so that the flocculated mud will not form.

This invention has the further object of displacing substantially all the mud in the localities desired during a cementation job and also providing a good seal near the wall of the borehole to prevent undesirable fluids from flowing along the wall of the borehole to the oil producing region.

A more specific object of this invention is to provide a cementation process wherein an inert slug of fluid displaces substantially all the drilling mud in the desired localities and forms a protective coat on the mud filter cake deposited on the walls of a borehole so that the organic matter in said mud filter cake cannot eventually cause the cement to deteriorate.

Other objects and advantages will be better understood from the following description, together with the attached drawing illustrating the preferred method and the advantages obtained therefrom.

Figure 1 shows diagrammatically a cross-section of a well which has been cemented without the use of my process.

Figure 2 shows diagrammatically my process being practiced on a well.

Figure 3 shows diagrammatically a cross-section of a well which has been cemented by the use of my process.

Referring specifically to Figure 1, there is shown a well having a borehole wall 1 and a well casing 3 within the borehole. The casing is provided with a casing head 4 and a casing shoe 5 whose functions are well known in the art. For purposes of illustration, the various oil, gas, and water sands which might be found in the earth are indicated as water sand A, oil sand B, gas sand C, oil sand D, and water sand E. It will be noted that shale layers between these sands always have washed out portions indicated, for example, at 6a, 6b, and 6c, which are created when the well is drilled.

In the embodiment of Figure 1 the well was drilled in the conventional manner leaving the clay drilling mud, which was introduced through conduit 2, in the casing 3 and in the annulus between the casing 3 and borehole wall 1. In all drilling operations the diameter of the borehole may vary as illustrated and also the casing is never exactly centered. This results in restricted portions which for purposes of illustration are exemplified as 7a and 7b which exist between the casing 3 and borehole wall 1. Several devices have been employed in an effort to prevent these restricted portions, such as centralizers and scratchers, none of which has been entirely satisfactory.

Upon completion of the drilling and in some cases even before completion of drilling it is desirable to seal off various sections of the borehole in order to prevent the flow of undesirable fluids into the oil producing areas. For example, it is desirable to prevent the flow of water and gas into the oil sands as shown in the drawing. Therefore, the annulus between the casing 3 and borehole wall 1 is filled with cement to prevent this flow.

The cementation of the well illustrated in Figure 1 was accomplished by introducing cement from cement pumps through the conduit 2. The cement was circulated downwardly between quantities of drilling mud and displacing mud through the casing 3 to the bottom of the well and then upwardly into the annulus between the casing 3 and the borehole wall 1. When the cement reached the section of the hole to be cemented, circulation was discontinued to allow the cement to set.

In the case of Figure 1 the cement contacted the clay drilling mud and reacted with the clay to form what is commonly referred to as flocculated mud. Furthermore, even without contacting the cement, the mud upon remaining quiescent tended to gel and a small amount of gelled mud was formed. As stated previously these flocculated and gelled muds had very high viscosities, and therefore, when they encountered the restrictions 7a and 7b they accumulated in such restrictions and the cement, taking the path of least resistance, passed around such accumulations and therefore did not displace the mud and fill up the restricted portions. Consequently, when these muds were not displaced and the cement hardened around them patches of mud 10 and 11 remained in the column of cement to thereby form channels or passages for undesirable fluids. The flocculated and gelled muds 12, 13, and 14 also collected in the washed out portions 6a, 6b, and 6c of the shale respectively. The cement also failed to displace these muds 12, 13, and 14 and, consequently, channels were also formed in the washed out portions through which undesirable fluids such as gas and water can flow.

A better understanding of the undesirable results of channeling may be gained by referring to the examples shown in Figure 1 wherein is illustrated a channel formed between the water sands A and the oil sands B. Such channel is formed by the mud 12 in the washed out portion 6a of the shale and the patch of mud 11 in the restricted portion 7a. Another example of undesirable channeling is the passages formed to the oil sand D from the gas sand C and the water sand E. These passages are formed by the mud 13 and 14 in the washed out portions 6b and 6c respectively and the accumulated mud 10 in the restriction 7b. It should be understood that these channels referred to above are merely for purposes of illustration only since it will be realized that passages for the undesirable fluids may be formed in innumerable ways and locations when the cement fails to displace the coagulated and gelled muds.

It is believed there are further disadvantages in conventional cementation methods as used in the cementing of the well shown in Figure 1. Clay drilling mud invariably forms on the permeable walls of the borehole (water, oil, and gas sands) a layer 8 of dehydrated mud which is commonly referred to as mud filter cake. This mud filter cake usually contains organic material which eventually deteriorates the cement thereby forming channels along the entire portion of the wall which is permeable. Furthermore, there are always some patches and stringers of viscous clay that are dispersed within the cement column. These patches 15 and stringers 16 are usually found near the top of the cement column as indicated in the drawing. These patches and stringers tend to weaken the cement column and may eventually fracture to form channels for the passage of undesirable fluids.

My invention provides means for displacing nearly all of the gelled mud and for preventing the formation of flocculated mud. Furthermore, in one embodiment of my invention my process helps to prevent the organic matter in the mud filter cake from deteriorating the cement. In accordance with my process, I place a volume of inert material, hereinafter referred to as an "inert slug of slurry," between the drilling mud and the quantity of cement which is to be employed in the cementation process. This inert slug of slurry for purposes of this invention may be defined as a volume of fluid consisting essentially of inorganic materials which do not contain soluble calcium compounds and which are suspended in a liquid, the combination of said inorganic materials and liquid being inert insofar as it will not deleteriously affect the viscosity of the drilling mud other than by simple dilution and its viscosity is not similarly affected by either the cement or the drilling mud other than by simple dilution. This inert material or slug slurry should also have a viscosity greater than the mud but less than the cement.

Figure 2 illustrates my method of cementation which involves displacing the mud from the well with an inert slurry and thereafter introducing cement therein. The mud 18 in the casing and in the annulus between the casing and the borehole is displaced by the slug slurry 17, followed by the cement 19. The mud 20 above the cement 19 forces the slug slurry 17 and cement 19 downwardly to the bottom of the borehole and then upwardly into the annulus between the casing and the walls of the borehole. When the cement has reached the section of the borehole which it is desired to cement, the movement of all fluids is discontinued and the cement is allowed to set.

It is readily seen that the cement 19 does not contact the mud 18 because of the inert slug slurry 17 therebetween, therefore, flocculation cannot result between the mud and the cement. Furthermore, since the slug slurry is inert there is no flocculation between the slug slurry and the cement, and since it is inorganic it will not affect the set of the cement. Consequently, my process has prevented the forming of any flocculated mud and most of the difficulty relating to channeling is avoided.

It should also be evident from my above description and introduction that the slug slurry 17, which is more viscous than the drilling mud 18, serves as a viscous plug to displace substantially all the mud from the casing and from the desired location in the annulus between the casing and the wall of the borehole. The slug slurry 17 because of its viscosity also cleans out or displaces nearly all the gelled mud in the annulus between the borehole 1 and casing 3 including the washed out portions 6a, 6b, 6c, etc., and the restricted portions 7a and 7b. This was not accomplished by other known methods. Therefore, the presence of contaminated cement and channels are reduced to a minimum when using my cementation process. Furthermore, my inert slug which consists of inorganic materials will not affect the set of the cement.

The solid constituent of my slug slurry can be made up of any inorganic materials which do not contain soluble calcium and which are capable of being suspended in a liquid. The solid constituent must be inorganic because practically all organic materials affect the set of the cement. If the inorganic material contains soluble calcium, a physical exchange involving the calcium ion and the clay results when the clay is contaminated causing the clay to become fluocculated and thus very viscous. I have discovered that raw cement mix, inert pozzolan, and calcium carbonates such as oyster shell and limestone are suitable and practical materials. Raw cement mix which is commonly known as a pulverized mixture of raw ingredients used in Portland cement manufacturing comprises argillaceous and calcareous material which does not contain soluble calcium and which has been crushed, mixed, and ground to a fine powder prior to being heated in a kiln during the Portland cement manufacturing process. Oyster shells and limestone are calcareous materials which are well known in the art and need no introduction. Inert pozzolan as used in this invention is a pozzolan sometimes referred to as pozzuolana, which does not contain soluble calcium. Pozzuolana is finely divided siliceous materials of volcanic orgin which do not contain cementitious properties itself but when mixed with lime forms a hydraulic cement. A commercial product commonly called Diamix A is an example of a commercial pozzuolana which contains some soluble calcium but which can be used in my process if a reacter, sodium pyrophosphate [$Na_4P_2O_7 \times 10H_2O$], is added thereto to convert the free lime [$Ca(OH)_2$] therein to insoluble calcium pyrophosphate [$Ca_2P_2O_4$].

Any of the materials set forth above can be used in my process either in combination or separately. Some of these materials have advantages over others, which advantages will be described more fully hereinafter, but each of the above materials when used as a slug between the cement and mud will prevent flocculation of the mud and thus aids in displacing substantially all of the mud from the localities where the cement is to be placed which is one very important object of this invention. It is also contemplated that numerous other inorganic materials may be used in my inert slug slurry without departing from the scope of this invention, such as dolomite, sand, etc., and it should be understood that this invention should not be limited to the materials listed above. It should also be understood that it is preferable for the slug slurry to consist only of inorganic materials which do not affect the viscosity of the mud and whose viscosity is not similarly affected by the cement or mud; however, it is realized that this optimum condition can rarely, if ever, be obtained but the ratio of such inorganic materials to other materials which do not contain the necessary properties should be sufficiently great that deleterious flocculation does not exist when the cement contaminates the slurry.

Another important property of the materials which are to be used in my process is that they be capable of being suspended in a liquid without going into solution. The material must also be sufficiently pulverized so that their "suspension time" is as long as the time it takes to perform the well cementing job. Some of the powdered materials such as oyster shell and limestone will remain suspended in water after stirring for a long enough time without the aid of a suspending agent; however, pozzolan and raw mix both of which are usually ground to a larger particle size may require addition of another ultrafine material in order to hamper the settling of the coarser particles. In some cases, the suspending agent to be used may have to be clay which is an excellent suspending agent because it disintegrates in water and forms colloidal particles; however, if clay is used as a suspending agent the proportion thereof should be only sufficient to perform the suspending function but not sufficient to cause appreciable and deleterious flocculation when the slurry becomes contaminated with cement.

The liquid that is to be used in this invention is any liquid which does not contain materials which will affect the viscosity of the mud and whose viscosity will not be affected by the mud or cement. Water is probably the best liquid for economic reasons, but oil or any other liquid can be used in my inert slug slurry without departing from the scope of this invention.

Examples of an inert slug slurry made in accordance with this invention and the proportions of water and the solid material are as follows:

I 0.48 lbs. sodium pyrophosphate
48 lbs. pozzolan (Diamix A)
42 lbs. water

II 55 lbs. raw mix
45 lbs. water

In Example I the ultimate viscosity of the inert slug slurry was 75 centipoises. This slug slurry was used to displace a mud of 46 centipoises. The ultimate viscosity of the slug slurry of Example II, which was used to displace a mud having a viscosity of 50 centipoises, was 80 centipoises.

It should be understood from these examples that the exact proportion of solid material and liquid does not form a part of this invention except that the proportions should be such that the viscosity of the inert slug slurry is less than the viscosity of the cement but more than the viscosity of the mud it displaces.

When a slug slurry made up of the above materials was used to displace the mud, I found that in many cases a quantity of the slurry was deposited on the walls of the borehole. These deposits of slurry seldom result in very much detrimental channeling, but in many cases channeling does result from these deposits which is somewhat detrimental and undesirable. However, if the material referred to above as pozzolan is used in the slug slurry the deposit of pozzolan slurry on the borehole wall may be beneficial. Pozzolan, as explained previously, has the property of setting when mixed with lime water, consequently when the residue of the pozzolan left on the borehole wall or elsewhere is subjected to the water from the cement which contains calcium hydroxide [$Ca(OH)_2$] the pozzolan will form a competent set cement. In this event, the pozzolan deposited on the wall of the borehole forms a protective barrier which protects the cement against the organic matter in the mud filter cake.

In Figure 3 is shown a cross-section of a well which has been cemented by my method using an inert slug slurry comprising pozzolan. As in Figure 1, which shows a cementation job without the use of my process, a layer 8 of mud filter cake is formed on the permeable walls of the borehole of Figure 3. This mud filter cake contains organic matter which might have the deleterious effect of eventually deteriorating the cement. However, pozzolan slurry is not affected in this manner. Thus, when the pozzolan is deposited on the wall of the borehole even if it is highly mud-contaminated, it will set with lime from the cement and prevent the undesirable flow of fluids into the oil producing zones. Furthermore, this hardened layer sometimes provides a protective film 21 for the cement which might be affected by the organic matter in the mud filter cake.

Figure 3 also shows that in all cases where any of my inert slug slurries are used substantially no flocculated mud formed and very little gelled mud remains in the restricted portions 7a and 7b and in the washed out portions 6a, 6b, 6c etc. This is true with the use of any of my inert slug slurries. The slug slurry prevents the forming of the flocculated mud and a much better displacement of the mud including the gelled mud results because of the higher viscosity of the slug slurry. In the case where pozzolan is used the small quantity of gelled mud that is not displaced from the washed out portions is isolated by the pozzolan protective film 21 as shown at 6a, 6b, and 6c in Figure 3.

Thus, it is seen that my invention generally comprises the preparation of a slug slurry containing inorganic material which is inert to both cement and mud and which has a viscosity greater than the mud which it displaces but less than the cement which follows it. It is also seen that the specific inert slurry comprising the pozzolan has another function and that is, it forms into a competent set cement which in some cases might protect the cement from being deteriorated by the organic matter in the mud filter cake which forms along the walls of the borehole.

The process of my invention is not to be limited by any theory as to mode of operation but only by the limitations in the following claim.

I claim:

In a process for the cementing of areas in a cased borehole in the presence of clay-type drilling mud wherein a quantity of cement is circulated downwardly through the casing to the bottom of the borehole and then upwardly into a selected area of the annulus between the casing and the walls of the borehole and thereafter circulation is stopped to allow the cement to set, the improvement which comprises circulating to said area of the annulus immediately ahead of said quantity of cement a slug of inert slurry consisting of a suspension of finely divided pozzolan in a liquid.

References Cited in the file of this patent

UNITED STATES PATENTS

| | | |
|---|---|---|
| 1,436,276 | Malmed | Nov. 21, 1922 |
| 2,083,625 | White | June 15, 1937 |
| 2,206,389 | Cannon | July 2, 1940 |
| 2,304,256 | Huebel | Dec. 8, 1942 |
| 2,433,668 | Jones | Dec. 30, 1947 |
| 2,582,909 | Laurence | Jan. 15, 1952 |

OTHER REFERENCES

Oil Well Cements, by W. C. Hanse, Proceedings of the Third International Symposium on the Chemistry of Cement, London, 1952; published by the Cement and Concrete Association, 52 Grosvenor Gardens, London S. W. 1, pages relied on 599 and 600.

"Composition and Properties of Oil Well Drilling Fluids," by Rogers, publisher Gulf Publishing Company 1948, pages 275 to 280 inclusive.

Hackh's Chemical Dictionary, third edition, 1944, published by the Blakiston Company.

UNITED STATES PATENT OFFICE
CERTIFICATE OF CORRECTION

Patent No. 2,848,051                                          August 19, 1958

William K. Williams

It is hereby certified that error appears in the printed specification of the above numbered patent requiring correction and that the said Letters Patent should read as corrected below.

Column 1, line 21, for "air" read -- aid --; column 6, lines 16 and 17, for

"0.48 lbs. sodium pyrophosphate
            48 lbs. pozzolan (Diamix A)"

read

-- 48 lbs. pozzolan (Diamix A)
   0.48 lbs. sodium pyrophosphate --;

same column 6, lines 63 and 64, after "borehole" insert a comma; line 74, after "6c" insert a comma.

Signed and sealed this 16th day of December 1958.

(SEAL)
Attest:

KARL H. AXLINE                                        ROBERT C. WATSON

Attesting Officer                                    Commissioner of Patents